(12) United States Patent
Shin

(10) Patent No.: US 8,517,845 B2
(45) Date of Patent: Aug. 27, 2013

(54) TORSIONAL VIBRATION DAMPER

(75) Inventor: Seung-Woo Shin, Ansan-si (KR)

(73) Assignee: Fukoku Korea Co., Ltd., Ansan-si (KR)

( * ) Notice: Subject to any disclaimer, the term of this patent is extended or adjusted under 35 U.S.C. 154(b) by 0 days.

(21) Appl. No.: 13/345,815

(22) Filed: Jan. 9, 2012

(65) Prior Publication Data

US 2013/0095964 A1    Apr. 18, 2013

(30) Foreign Application Priority Data

Oct. 12, 2011  (KR) .......................... 10-2011-0104075

(51) Int. Cl.
*F16D 3/76* (2006.01)

(52) U.S. Cl.
USPC .................. 464/89; 403/12; 474/902; D8/360

(58) Field of Classification Search
USPC ................. 464/89–91; 474/94, 902; 403/12, 403/383; 29/892–892.3; 301/111.04; D8/360
See application file for complete search history.

(56) References Cited

U.S. PATENT DOCUMENTS

| | | | | |
|---|---|---|---|---|
| 4,077,233 A | * | 3/1978 | Hornig et al. | ................... 464/89 |
| 4,714,371 A | * | 12/1987 | Cuse | ......................... 403/383 X |
| 4,718,526 A | * | 1/1988 | Koitabashi | .................. 464/89 X |
| 5,441,456 A | * | 8/1995 | Watanabe et al. | .............. 474/94 |
| 5,591,093 A | * | 1/1997 | Asai et al. | ....................... 474/94 |
| 6,875,113 B2 | * | 4/2005 | Nichols | ........................ 474/94 X |

FOREIGN PATENT DOCUMENTS

| | | | | |
|---|---|---|---|---|
| JP | 6-300118 A | * | 10/1994 | ..................... 474/94 |
| JP | 2007-255432 | | 10/2007 | |

* cited by examiner

*Primary Examiner* — Gregory Binda
(74) *Attorney, Agent, or Firm* — Novick, Kim & Lee, PLLC; Jae Youn Kim

(57) ABSTRACT

A torsional vibration damper which comprises of a hub 12 having a central hole 3 to be inserted on the crankshaft and being formed to have a recess opened on one side, a disc 4 extending from the hub 2, a rim 5 being bent and extending from the periphery of the disc 4, a rubber layer 6 attached on the outer surface of the rim 5, and a ring member 8 or pulley inserted on the outer surface of the rubber layer 6, wherein a polygonal recess 10 is formed on the connecting area between the hub 2 and the disc 4 so that the polygonal recess 10 surrounds the hub 2.

4 Claims, 5 Drawing Sheets

TORSIONAL VIBRATION DAMPER

BACKGROUND OF THE INVENTION

1. Field of the Invention

The invention relates to a torsional vibration damper, and more particularly to a torsional vibration damper which could be easily assembled on the crankshaft with sufficient clamping force to achieve a high quality torsional vibration damper with easy assembling.

2. Description of the Related Art

In general, as a periodical torque acts on the crankshaft of the vehicle engine, a torsional vibration may be generated. The larger the rotating force of crankshaft is, the more the torsional vibration is, and the longer the length of the crankshaft is or the smaller the rigidity of the crankshaft is, the more the torsional vibration is. If the rotation speed of the crankshaft reaches to a certain point, then the torsional vibration may resonate with the proper vibration of the crankshaft itself to incur a serious vibration, which results in a bad ride feeling and damages of the timing gear or crankshaft.

In order to reduce the torsional vibration of the crankshaft, a torsional vibration damper pulley is mounted at the front end of the crankshaft. The torsional vibration damper includes a rubber layer along the periphery of the hub and a pulley is mounted on the outer surface of the rubber layer, so that it could reduce the periodic torsional vibration caused by the eccentric rotation of the crankshaft, and drive the components such as a water pump or an alternator which are connected by belts hung on the pulley.

FIG. 1 and FIG. 2 show the conventional torsional vibration damper. As shown, the conventional vibration damper includes a hub 2 having a central hole 3 in which a crankshaft is coupled and being formed to have a recess opened on one side, a disc 4 extending from the hub 2, a rim 5 being bent and extending from the periphery of the disc 4, a rubber layer 6 of ring shape attached on the outer surface of the rim 5, and a ring member 8 inserted on the outer surface of the rubber layer 6. A pulley is forcedly inserted or welded on the ring member 8. The pulley may be inserted on the ring member 8 or on the rubber layer 6 directly.

A plurality of grip holes 7 are formed on the disc 4 which are gripped by robot arm to move the damper to a desired place in the assembling stage. But the size of the grip hole 7 is relatively small, so the grip means on the robot arm could not be speedily and correctly aligned with the grip hole 7 of the disc 4, and it is not easy to control the robot arm to pick up the damper.

According to the tendency of demanding for weight reduction of car, the light weight torsional vibration damper pulley is also demanded. Accordingly, it has been attempted to make the torsional vibration damper with light weight metal plate instead of heavy iron cast. If the damper is made of pressed metal plate, the thickness of the disc 4 outside the hub 2 becomes thinner. If the disc 4 is thin, the contact area between the grip means of the robot arm and the grip hole 7 may be also small, so the grip means could not firmly grip the damper, or the grip hole 7 may be deformed, so that the damper pulley could not be firmly assembled on the crankshaft, or assembling error may happens. In consideration of the situation, a blind hole cap 9 may be inserted on the grip hole 7 to prevent the deformation of the grip hole 7 and transfer the sufficient clamping force to the disc 4. But the step of inserting the hole cap 9 into the grip hole 7 is rather cumbersome, and the hole cap 9 may drop out from the grip hole 7.

SUMMARY OF THE INVENTION

The present invention is made to solve the above problem about the torsional vibration damper, and the object of the invention is to provide a high quality lightweight torsional vibration damper to be mountable on the crankshaft firmly with easy and simple assembling process.

To achieve the above object, there is provided a torsional vibration damper which comprises of a hub 12 including a circular side wall 15 having a central hole 3 configured to receive a crankshaft and a short cylindrical portion 16 extending from an outer end of the circular side wall 15 and substantially perpendicular to the circular side wall, wherein the circular side wall and the cylindrical portion define a circular recess opened on one side and located inside the hub, a connecting element 17 extending from the hub, a disc 14 extending from the connecting element 17, a rim 5 being bent and extending from the periphery of the disc 14, a rubber layer 6 attached on the outer surface of the rim 5, and a ring member 8 or pulley inserted on the outer surface of the rubber layer 6, wherein the connecting element is configured to connect the hub 12 and the disc 14, wherein an inner surface of the connecting element 17 defines a polygonal recess 10 located adjacent to the circular recess and an in-circle of the polygonal recess 10 is larger than the hub 12, and wherein the polygonal recess 10 is configured to be used by a grip mechanism of a robot to install the torsional vibration damper to the crankshaft.

Preferably but not necessarily, the opening of the polygonal recess 10 is open to the same direction of that of the hub 12.

Preferably but not necessarily, the polygonal recess 10 is in the shape of hexagon.

DETAILED DESCRIPTION OF THE INVENTION

Figure 1:
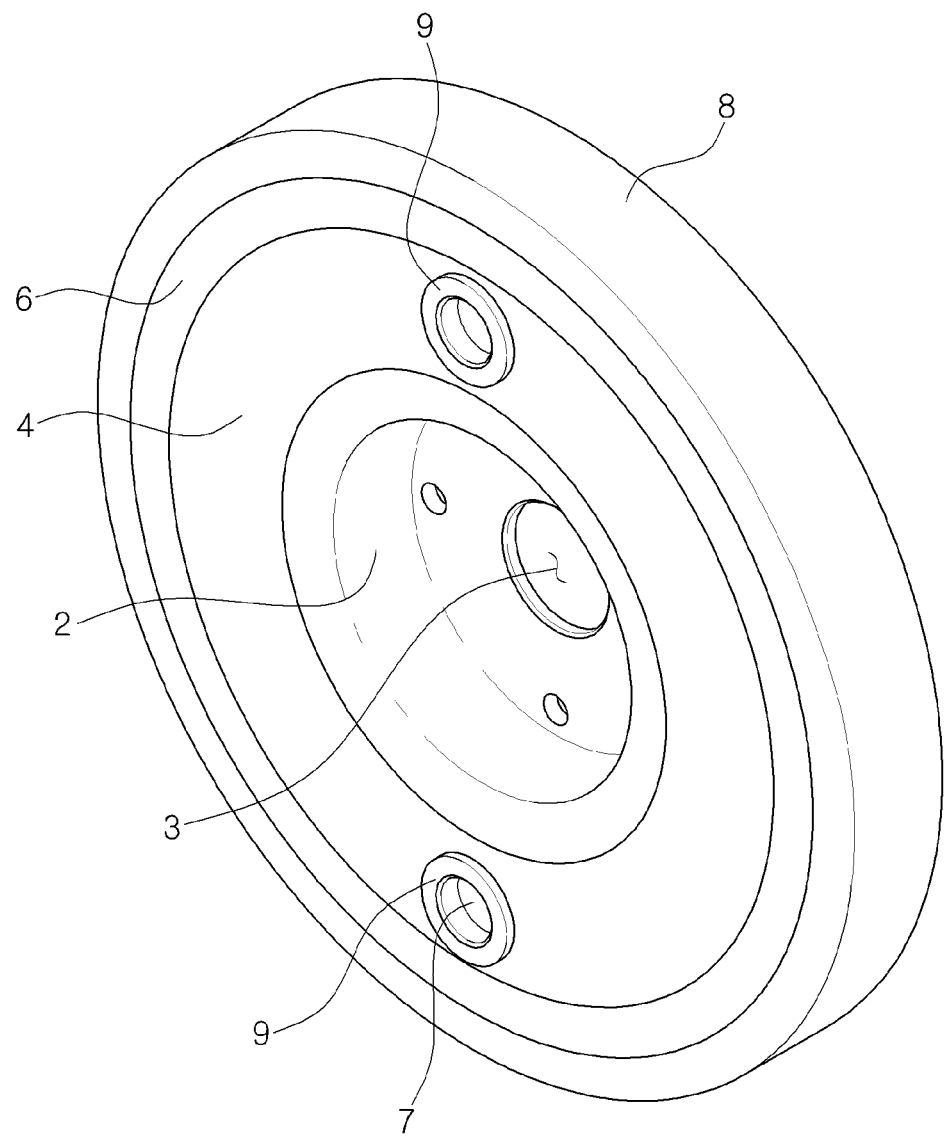
FIG. 1 is a perspective of the conventional torsional vibration damper.
Figure 2:
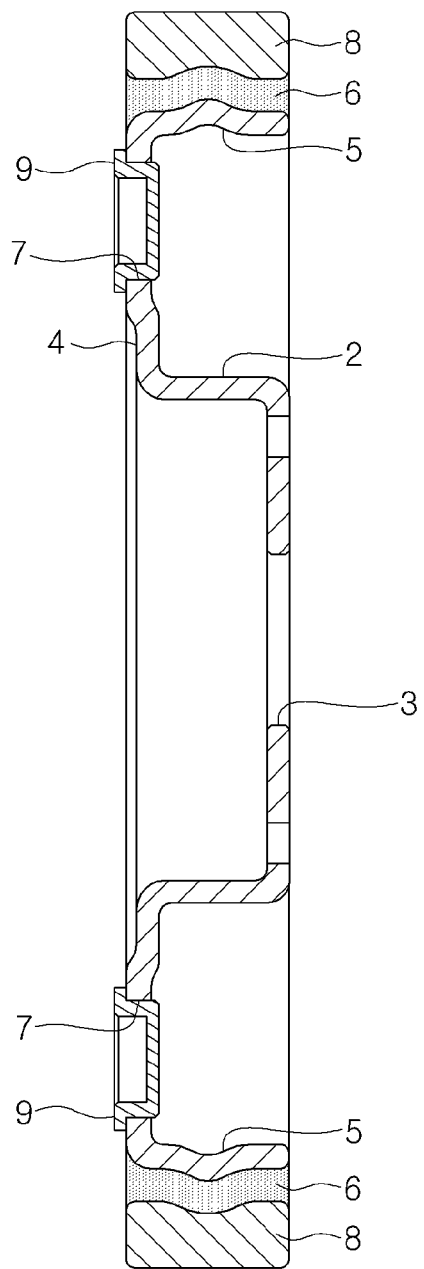
FIG. 2 is a section of FIG. 1
Figure 3:
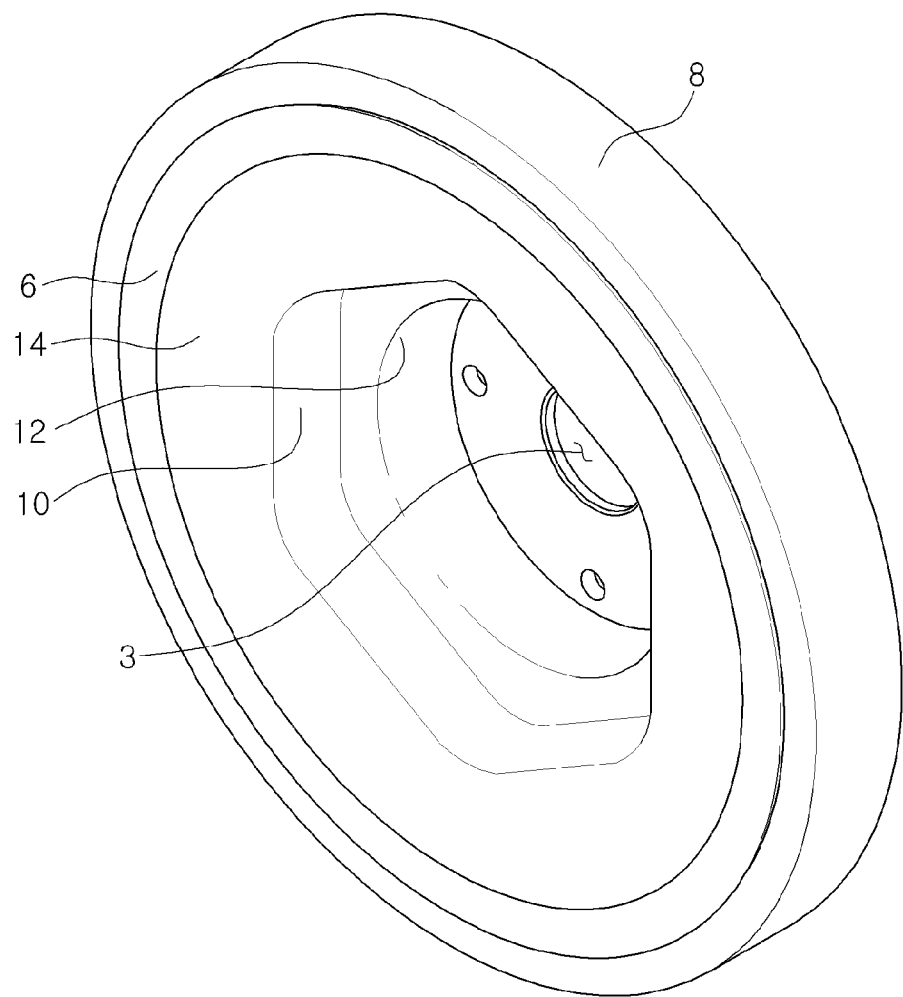
FIG. 3 is a perspective of the embodiment of the invention
Figure 4:
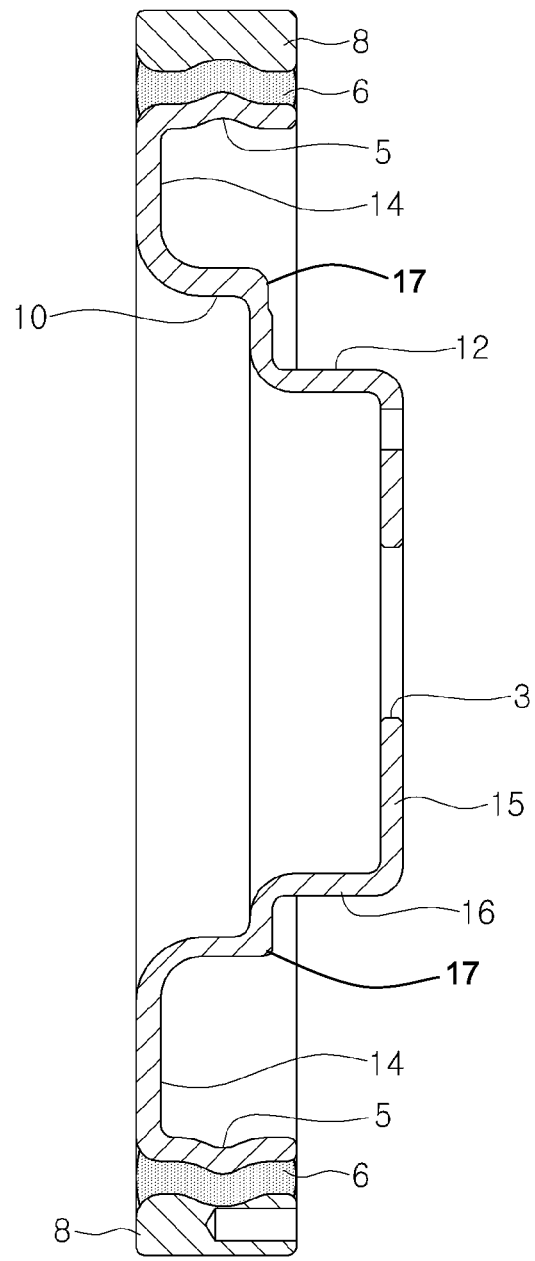
FIG. 4 is a section of the embodiment of FIG. 3
Figure 5:
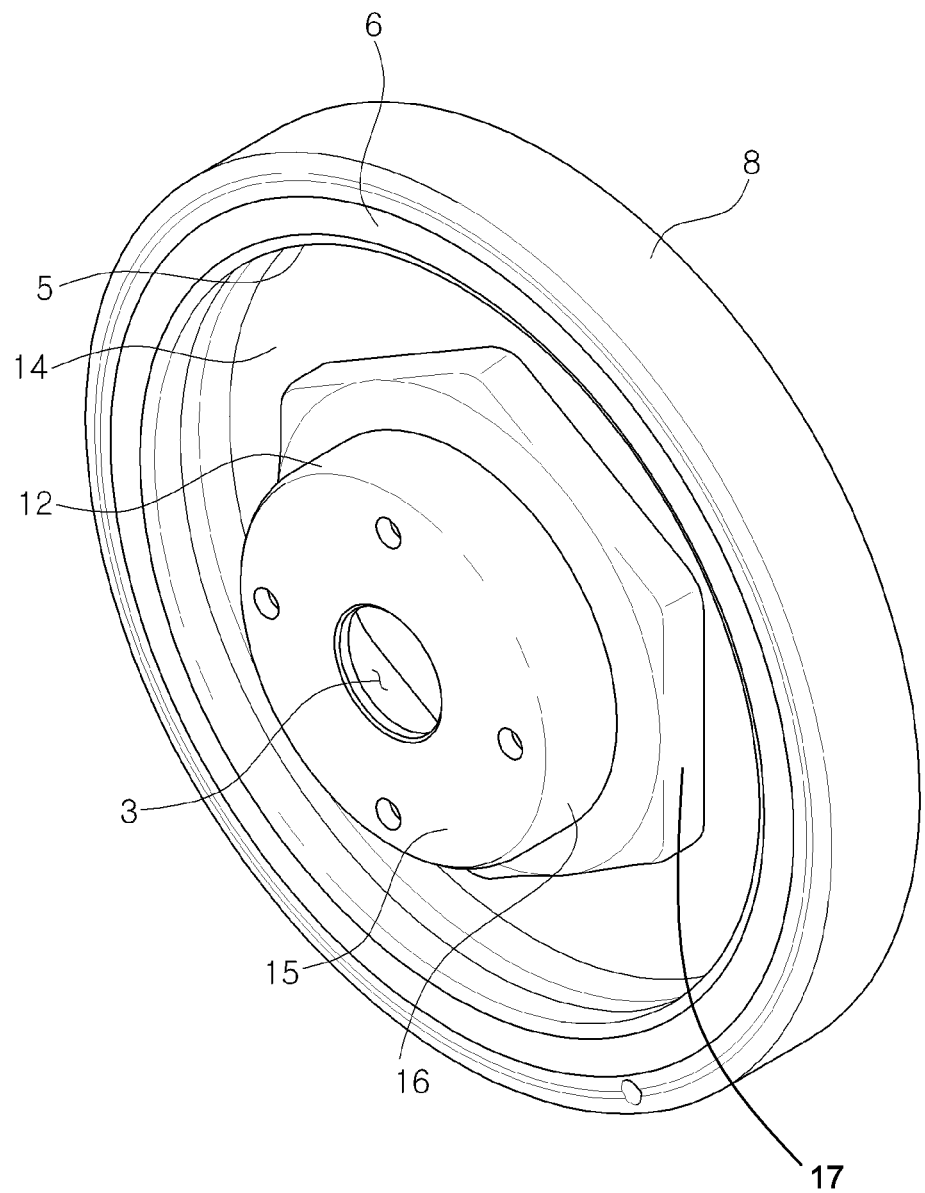
FIG. 5 is a rear side perspective of the embodiment of FIG. 3

Referring to FIG. 3 to FIG. 5, the preferred embodiment of the invention is explained. As shown in FIGS. 3 to 5, the invention includes a hub 12 including a circular side wall 15 having a central hole 3 to be inserted on a crankshaft and a short cylindrical portion 16 being bent from the outer end of the circular side wall 15, a disc 14 which is integral with and extending from the hub 12, and a rim 5 being bent and extending from the periphery of the disc 14 in the parallel direction with the crankshaft.

A rubber layer 6 is attached on the outer surface of the rim 5 to absorb the vibration. And a ring member 8 is inserted on the outer surface of the rubber layer 6, which functions as a weight body of the damping mechanism. A pulley (not shown) having a plurality of groove on the outer surface is engaged on the outer surface of the ring member 8. Preferably, the ring member 8 and the pulley are formed with separate members, but the ring member 8 and the pulley may be made integral one member.

In this torsional vibration damper, a polygonal recess 10 is formed on the disc 14 whose incircle is larger than the hub 12 so that the polygonal recess 10 surrounds the hub 12. Therefore, the hub 12 is disposed inside the polygonal recess 10. Preferably, the polygonal recess 10 is in the shape of hexagon. And preferably, the opening of the polygonal recess 10 is open to the same direction of that of the hub 12.

If the polygonal recess 10 is formed on the disc 14 to surround the hub 12, in the assembling stage, the grip means of the robot arm could be easily aligned with the relatively big polygonal recess 10, and the contacting area between the grip means and the polygonal recess 10 is increased, so that higher clamping force could be exerted to couple the torsional vibration damper into the crankshaft, and the damage of the disc due to the high clamping force could be prevented, so that the high quality damper pulley with easy assembling could be achieved.

And, as the opening of the polygonal recess 10 is open in the same direction with that of the hub 12, the polygonal recess 10 and the hub 12 could be formed in the same process at the same time or in the sequential process during press forming to attain higher productability. And as the polygonal recess 10 is formed in the hexagonal shape, the rotational balance could be kept more smoothly than the rectangular recess, and the clamping force between the grip means and the polygonal recess 10 could be kept higher than the octagonal recess.

What is claimed is:

1. A torsional vibration damper comprising:
    a hub including a circular side wall having a central hole configured to receive a crankshaft and a cylindrical portion extending from an outer end of the circular side wall and substantially perpendicular to the circular side wall, wherein the circular side wall and the cylindrical portion define a circular recess opened on one side and located inside the hub;
    a connecting element extending from the hub;
    a disc extending from the connecting element;
    a rim being bent and extending from a periphery of the disc;
    a rubber layer attached on an outer surface of the rim; and
    one of a ring member or a pulley located on an outer surface of the rubber layer,
    wherein the connecting element is configured to connect the hub and the disc,
    wherein an inner surface of the connecting element defines a polygonal recess located adjacent to the circular recess and an in-circle of the polygonal recess is larger than the hub; and
    wherein the polygonal recess is configured to be used by a grip mechanism of a robot to install the torsional vibration damper to the crankshaft.

2. The torsional vibration damper of claim 1, wherein the polygonal recess is open to the same direction of that of the hub.

3. The torsional vibration damper of claim 2, wherein the polygonal recess is in the shape of hexagon.

4. The torsional vibration damper of claim 1, wherein the polygonal recess is in the shape of hexagon.

* * * * *